US009969921B2

United States Patent
Wang et al.

(10) Patent No.: US 9,969,921 B2
(45) Date of Patent: May 15, 2018

(54) OIL AND GAS TREATMENT COMPOSITION COMPRISING HYDROXYETHYL CELLULOSE AND CROSSLINKED POLYVINYLPYRROLIDONE

(71) Applicant: HERCULES INCORPORATED, Wilmington, DE (US)

(72) Inventors: Jianzhao Wang, Hockessin, DE (US); Mohand Melbouci, Wilmington, DE (US)

(73) Assignee: HERCULES LLC, Wilmington, DC (US)

( * ) Notice: Subject to any disclaimer, the term of this patent is extended or adjusted under 35 U.S.C. 154(b) by 0 days. days.

(21) Appl. No.: 15/064,999

(22) Filed: Mar. 9, 2016

(65) Prior Publication Data
US 2016/0264836 A1    Sep. 15, 2016

Related U.S. Application Data

(60) Provisional application No. 62/132,028, filed on Mar. 12, 2015.

(51) Int. Cl.
| | | |
|---|---|---|
| *C09K 8/10* | (2006.01) | |
| *C09K 8/12* | (2006.01) | |
| *C09K 8/035* | (2006.01) | |
| *C09K 8/20* | (2006.01) | |

(52) U.S. Cl.
CPC ............ *C09K 8/20* (2013.01); *C09K 2208/12* (2013.01)

(58) Field of Classification Search
None
See application file for complete search history.

(56) References Cited

U.S. PATENT DOCUMENTS

| | | | | |
|---|---|---|---|---|
| 3,132,693 | A | * | 5/1964 | Weisend ................. C04B 28/02 166/293 |
| 4,758,357 | A | | 7/1988 | Hoff |
| 5,073,614 | A | | 12/1991 | Shih et al. |
| 6,548,597 | B2 | | 4/2003 | Hood et al. |
| 6,620,769 | B1 | * | 9/2003 | Juppe ...................... C04B 24/36 507/103 |
| 6,823,939 | B2 | | 11/2004 | Bouwmeester et al. |

(Continued)

FOREIGN PATENT DOCUMENTS

| | | |
|---|---|---|
| WO | WO 9321931 | 11/1993 |
| WO | WO2008150468 A1 | 12/2008 |

OTHER PUBLICATIONS

JOC Article published on Nov. 10, 2009.
(Continued)

*Primary Examiner* — Jeffrey Washville
(74) *Attorney, Agent, or Firm* — Dunlap Codding, P.C.; Shaorong Chen

(57) ABSTRACT

The present application relates to an oil and gas treatment composition comprising (i) a blend of hydroxyethyl cellulose (HEC) and crosslinked polyvinylpyrrolidone, (ii) an aqueous based continuous phase, (iii) a reactive clay or shale material, and (iv) at least one drilling fluid additive. The present application also relates to a method for inhibiting hydration of clays or shale materials in drilling a subterranean well using the composition. A different embodiment of the application discloses that the composition additionally comprises organophilic clay, a stabilizer and white medicinal oil.

16 Claims, 1 Drawing Sheet

(56) References Cited

U.S. PATENT DOCUMENTS

| | | | |
|---|---|---|---|
| 7,087,554 B2 * | 8/2006 | Youngson | B82Y 30/00 |
| | | | 507/123 |
| 7,687,441 B2 * | 3/2010 | Hanes, Jr. | C08K 5/55 |
| | | | 166/308.2 |
| 7,786,049 B2 | 8/2010 | Temple et al. | |
| 7,833,945 B2 | 11/2010 | Harrower et al. | |
| 8,258,085 B2 | 9/2012 | Melbouci et al. | |
| 2014/0034323 A1 * | 2/2014 | Dobson, Jr. | C09K 8/90 |
| | | | 166/308.5 |

OTHER PUBLICATIONS

International Journal of Pharmaceutics published on Dec. 23, 2007.
SHKim carbohydrate polymers accepted Apr. 2, 1999.

* cited by examiner

OIL AND GAS TREATMENT COMPOSITION COMPRISING HYDROXYETHYL CELLULOSE AND CROSSLINKED POLYVINYLPYRROLIDONE

CROSS REFERENCE TO RELATED APPLICATIONS

The present application claims the benefit under 35 U.S.C. 119 (e) of U.S. Provisional Patent Application Ser. No. 62/132,028, filed on Mar. 12, 2015, the entire content of which is hereby expressly incorporated herein by reference.

FILED OF THE INVENTION

The present application relates to an oil and gas treatment composition comprising a blend of hydroxyethyl cellulose (HEC) and crosslinked polyvinylpyrrolidone (PVP), a process for preparing the same and a method of inhibiting hydration of clays applying the composition.

BACKGROUND OF THE INVENTION

Subterranean drilling operations are procedures conducted below the surface of the earth from a formation such as in the course of recovering oil, gas, and other substances. Typically, rotary subterranean drilling operations involve attaching a drill bit on a lower end of a drill string to form a drilling tool and rotating the drill bit along with the drill string into a subterranean formation to create a well bore through which subsurface formation fluids may be recovered. During subterranean drilling operations, subterranean well bores may encounter with shales, which make up over 75% drilling formation. Shale instability results in significant borehole problems including hole collapse, tight hole, stuck pipe, poor hole cleaning, etc. Reactive shales are materials like clays (e.g. bentonite) and other subterranean materials that swell when exposed to water. Reactive shales can cause shale instability problems during drilling because of their tendency to degrade and react with water when exposed to aqueous-based drilling fluids. This degradation can result in undesirable drilling conditions because degradation of the shale may interfere with attempts to maintain the integrity of drilled cuttings traveling up the well bore until the cuttings can be removed by solids control equipment located at the surface. Degradation of drilled cuttings prior to their removal at the surface greatly prolongs drilling time because the shale particles traveling up the well bore break up into smaller particles. These smaller particles increasingly expose new surface area of the shale to the drilling fluid, which leads to still further absorption of water and further degradation.

Consequently, subterranean drilling operations generally employ drilling fluids to inhibit shale swelling and improve environmental performance. Drilling fluids used in such operations may be fluids (gaseous or liquid), mixtures of fluids, and solids (solid suspensions, emulsions, gases and solids). Drilling fluids are also used to cool the drill bit, lubricate the rotating drill, prevent blowouts, and remove drill cuttings from the well bore.

Numerous patents and published patent applications describe the techniques or products that can be used to inhibit the swelling of clays and shales. The swelling inhibiting compositions disclosed include inorganic phosphates (U.S. Pat. No. 4,605,068); polyalkoxy diamines and their salts (U.S. Pat. Nos. 6,484,821; 6,609,578; and 6,247,543 and U.S. Pub. No. 2003/0106718); choline derivatives (U.S. Pat. No. 5,908,814); oligomethylene diamines and their salts (U.S. Pat. No. 5,771,971 and U.S. Pub. No. 2002/0155956); the addition product of carboxymethyl cellulose and an organic amine (WO 2006/013595); 1,2-cyclohexanediamine and/or their salts (WO 2006/013597); salts of phosphoric acid esters of oxyalkylated polyols, (WO 2006/013596); the combination of a partially hydrolyzed acrylic copolymer, potassium chloride and polyanionic cellulose (U.S. Pat. No. 4,664,818); quaternary ammonium compounds (U.S. Pat. No. 5,197,544); polymers based on dialkyl aminoalkyl methacrylate, (U.S. Pat. No. 7,091,159); aqueous solutions containing a polymer with hydrophilic and hydrophobic groups, (U.S. Pat. No. 5,728,653); the reaction product of a polyhydroxyalkane and an alkylene oxide (U.S. Pat. No. 6,544,933). The shale swelling inhibitors are also disclosed in U.S. Pat. Nos. 8,258,085; 7,087,554; 7,549,474; 7,833,945; and 6,620,769. Further background information can be found in A. V. Reis, et al, J. Org. Chem., 2009, 74, 3750-3757; U.S. Pat. No. 5,037,930; S. H. Kim, et al, Carbohydrate Polymers 40 (1993) 180-190; and Fhilype J., et al, International Journal of Pharmaceutics, 355 (2008) 184-194.

Conventional methods for inhibiting shale swelling during drilling have widely adopted oil and synthetic based drilling fluids. However, water based shale swelling drilling inhibitors are now increasingly employed as they are more environmentally friendly. Many of such shale swell inhibitors show good inhibition performance in the oil based drilling operations but their applications are limited due to their insufficient biodegradability. Therefore, there is a need for shale swelling inhibitors having enhanced biodegradability.

U.S. Pat. No. 8,258,085 discloses that an aqueous fluidized polymer suspension for use in oilfield applications comprises an allyloxy based co-polymer; a water soluble polymer; a salt; and water, wherein the water soluble polymer is selected from the group consisting of hydroxyethyl cellulose (HEC), carboxymethyl cellulose (CMC), guar, guar derivatives and xanthan and wherein the allyloxy based co-polymer and the water soluble polymer are dispersed in the water containing the salt.

U.S. Pat. No. 6,620,769 discloses an oil-based fluid polymer suspension (FPS) composition for use in oil or gas well servicing fluids comprising (a) a hydrophilic polymer, (b) an organophilic clay, (c) a stabilizer that is a non-ionic surfactant and (d) a white medicinal oil that is non-toxic and biodegradable 60% at least after 28 days in freshwater and seawater under OECD 301 and OECD 306 test protocols, wherein the FPS composition is environmentally acceptable for use in onshore and offshore oil field servicing fluids.

GB Patent No. 2,267,921 discloses a drilling fluid system containing a homopolymer of polyvinylpyrrolidone (PVP) used as a shale inhibiting additive, wherein the PVP is present at concentrations of 0.01% to 5.0% by weight.

U.S. Pat. No. 4,142,595 discloses a clay-free aqueous drilling fluid comprising: (a) 0.2 to 1.5 pounds per barrel of flaxseed gum; (b) a predetermined amount of at least one salt having a cation selected from the group consisting of potassium and ammonium, said amount providing a cation concentration in said drilling fluid of at least 10,000 ppm; and (c) a non-clay viscosifier selected from the group consisting of carboxymethyl cellulose, hydroxyethyl cellulose (HEC), and hydroxyethyl cellulose plus a heteropolysaccharide produced by the bacterium *Xanthomonus campestris* NRRL B-1459.

In view of the foregoing, it is an object of the present application to provide environmentally friendly and biodegradable shale swell inhibitors which have high shale recovering ability during oil and gas based drilling operations.

Serendipitously, it has been discovered that hydroxyethyl cellulose (HEC), a non-ionic water soluble polymer blended with crosslinked polyvinylpyrrolidone can demonstrate excellent shale swell inhibition properties.

SUMMARY OF THE INVENTION

The present application discloses an oil and gas treatment composition comprising a blend of hydroxyethyl cellulose and crosslinked polyvinylpyrrolidone.

One aspect of the present application discloses an oil and gas treatment composition comprising: (i) a blend of hydroxyethyl cellulose and crosslinked polyvinylpyrrolidone, (ii) an aqueous based continuous phase, (iii) a reactive clay or shale material, (iv) a salt, and (v) at least one drilling fluid additive.

According to another aspect of the present application, it is provided with an oil-well servicing fluid composition comprising: (i) a blend of hydroxyethyl cellulose and crosslinked polyvinylpyrrolidone, (ii) an aqueous based continuous phase, (iii) a reactive clay or shale material, (iv) a salt, (v) at least one drilling fluid additive, and (vi) a particulate component.

Another aspect of the present application discloses a method for inhibiting hydration and swelling of clays or shale materials in drilling a subterranean well comprising using an oil and gas treatment composition comprising: (i) a blend of hydroxyethyl cellulose and crosslinked polyvinylpyrrolidone, (ii) an aqueous based continuous phase, (iii) a reactive clay or shale material, (iv) a salt, and (v) at least one drilling fluid additive.

The present application also discloses a method of inhibiting hydration and swelling of clays or shale materials in drilling a subterranean well, comprising the steps of: (i) preparing an aqueous drilling fluid composition comprising (a) an aqueous based continuous phase comprising fresh water, seawater, brine, simulated brine, or mixtures thereof; (b) a reactive clay or shale material; and (c) a shale hydration inhibitor comprising HEC and crosslinked polyvinylpyrrolidone, (ii) circulating the aqueous drilling fluid composition into and through the well, and (iii) contacting the clays or shale materials during the circulation with a sufficient amount of the aqueous based drilling liquid for inhibiting hydration of the clays or shale materials.

BRIEF DESCRIPTION OF THE DRAWINGS

Further embodiments of the present application can be understood with the appended figures.

DETAILED DESCRIPTION OF THE INVENTION

Figure 1A:
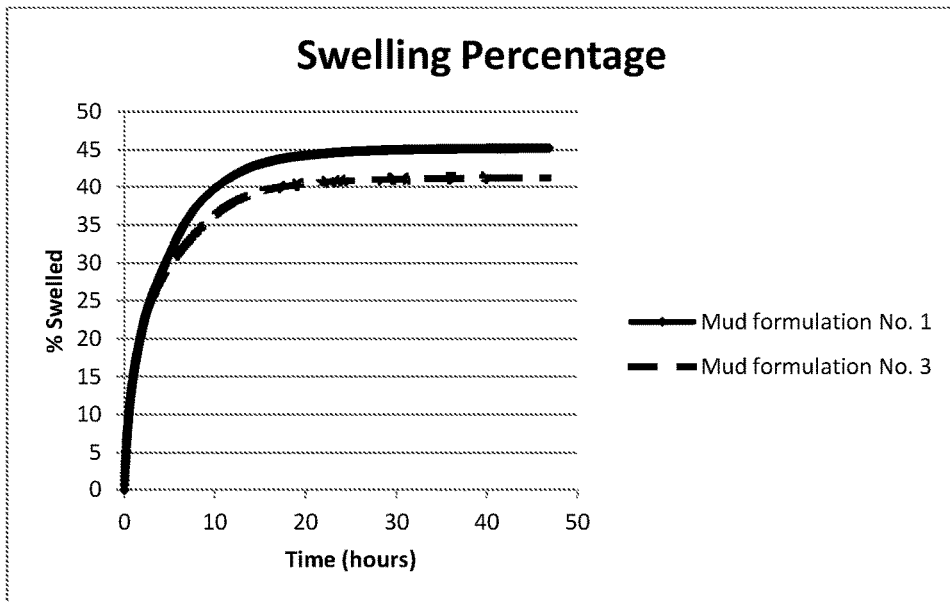
FIG. 1a shows the swelling percentages of Mud Formulations 1 and 3 prepared in Example 2.

While this specification concludes with claims particularly pointing out and distinctly claiming which is regarded as the invention, it is anticipated that the invention can be more readily understood through reading the following detailed description of the invention including examples.

All references to singular characteristics or limitations of the present application shall include the corresponding plural characteristic or limitation, and vice-versa, unless otherwise specified or clearly implied to the contrary by the context in which the reference is made.

Numerical ranges as used herein are intended to include every number and subset of numbers contained within that range, whether specifically disclosed or not. Further, these numerical ranges should be construed as providing support for a claim directed to any number or subset of numbers in that range.

References herein to "one embodiment," "one aspect", "one version" or "one objective" of the invention include one or more such embodiment, aspect, version or objective, unless the context clearly dictates otherwise.

All publications, articles, papers, patents, patent publications, and other references cited herein are hereby incorporated in their entireties for all purposes to the extent consistent with the disclosure herein.

The unit "pounds per barrel" can also be specified as "ppb" or "lbm/bbl", wherein one lbm/bbl or ppb is the equivalent of one pound of additive in 42 US gallons of mud. The "m" is used to denote mass to avoid possible confusion with pounds force (denoted by "lbf"). In SI units, the conversion factor is one pound per barrel equals 2.85 kilograms per cubic meter. For example, 10 lbm/bbl=28.5 $kg/m^3$.

The term "crosslinked" herein refers to a composition containing intra-molecular and/or intermolecular crosslinks, whether arising through a covalent or non-covalent bonding. "Non-covalent" bonding includes both hydrogen bonding and electrostatic (ionic) bonding.

The term "monomer" refers to a molecule of simple structure and low molecular weight that is capable of combining with a number of like or unlike molecules to form a polymer. A monomer is a compound that chemically bonds to other molecules, including other monomers, to form a polymer.

The term "polymer" refers to both linear and branched polymers derived from one or more monomer units, which may or may not be crosslinked, or grafted. Non-limiting examples of polymers include copolymers, terpolymers, tetramers, and the like, wherein the polymer is a random, block, or alternating polymer.

The term "shale swell inhibitors" refers to at least one natural or organic compound that reduces the reactivity of a reactive clay or shale material by reducing one or more of the amount of swelling, dispersing, migration, swelling induced migration, and the like in the presence of aqueous medium as described in the present application, specifically, fresh water.

Further, for the purpose of this application, the expressions "reactive shale" or "reactive clay" or "shale material" or similar expressions may be used interchangeably and refer to those shale or clay materials that may swell, crumble, particalize, flake, slough off or otherwise deteriorate when exposed to aqueous medium, particularly in the presence of water.

As used herein, the expressions of "drilling mud(s)", "drilling fluids", "mud(s)", or similar expressions may be used interchangeably and are meant to encompass those fluids used during the drilling of a wellbore.

As used herein "suspension" and "dispersion" are used interchangeably to mean a system in which solid particles (water-soluble polymer) are dispersed in a liquid (for example, but not by way of limitation, water). It should also be understood that "solution" means a homogeneous mixture of a solvent (e.g., water) with a solute (e.g., dissolved salt, dissolved water-soluble polymer, etc.).

The present application discloses an oil and gas treatment composition comprising, consisting of, or consisting essentially of a blend of hydroxyethyl cellulose (HEC) and crosslinked polyvinylpyrrolidone.

Further, the crosslinked polyvinylpyrrolidone has a Brookfield viscosity in 5% aqueous solution of from about 100 to about 10,000 mPa·s. The Brookfield viscosity of crosslinked polyvinylpyrrolidone in 5% aqueous solution can be from about 200 to about 8,000 mPa·s, or from about 300 to about 6,000 mPa·s, or from about 500 to about 4,000 mPa·s.

It is contemplated to employ crosslinked polyvinylpyrrolidone for preparing an oil and gas treatment composition of the present application, wherein the crosslinking agents for preparing the crosslinked polyvinylpyrrolidone comprise at least two olefinic double bonds. Examples of the crosslinking agents can include, but are not limited to N,N'-divinylimidazolidone (DVI), N,N',N"-triallyl-triazine-trione, methyene-bis-acryamide, methylene-bis-(meth) acrylamide, triallyl amine, triallylglucose, ethyleneglycol-di-(meth)acrylate, diethyleneglycol-di-(meth)acrylate, triethyleneglycol-di-(meth)acrylate, tetraethyleneglycol-di-(meth)acrylate, polyethyleneglycol-di-(meth)acrylate, pentaerythritol-tri-allylether, pentaerythritol-di-allylether, pentaerythritol-tetra-allylether, pentaerythritol-di-(meth) acrylate, pentaerythritol tri(meth)acrylate, pentaerythritol-tetra-(meth)acrylate, 1-vinyl-3-(E)-ethylidene-pyrrolidone (EVP), allyl methacrylamide, allyl glycidyl ether, glycidyl acrylate, hydroxyacrylamide, triallyl-1,3,5-triazine-2,4,6 (1H,3H,5H)-trione, 2,4,6-triallyloxy-1,3,5-triazine and/or divinylbenzene.

In one non-limiting embodiment, the crosslinking agent for preparing the crosslinked PVP of the present application is selected from the group consisting of N,N'—N,N'-divinylimidazolidone (DVI), pentaerythritol-tri-allylether, triallyl-1,3,5-triazine-2,4,6(1H,3H,5H)-trione and 2,4,6-triallyloxy-1,3,5-triazine.

The amounts of crosslinking agent can be changed from about 0.1 to about 5% by weight of vinyl pyrrolidone. In one non-limiting embodiment, the crosslinking agent is present in an amount of from about 0.3% to about 1.0% by weight based on the weight of the vinylpyrrolidone. In another non-limiting embodiment, the crosslinking agent is present in an amount of from about 0.4% to about 0.8% by weight based on the weight of the vinyl pyrrolidone.

Further, it is contemplated to employ other possible crosslinking agents for the present application, which is selected from the group consisting of melamines, formaldehyde, chromates, polyfunctional silanes, zirconates, borates, polyfunctional acids, poly functional amines, alkylamino derivatives of methacrylic acids, alkylamino derivatives of methacrylamides, acid anhydrides, unsaturated aliphatic acids, vinyl derivatives, silanes, oxirane based glycidyl ethers, glycidyl acrylates, epoxy compounds, acrylic anhydrides, oxazoline derivatives, benzoxazine compounds, aziridine compounds, aziridine derivatives of methacrylates, isocyano derivatives of methacrylate, carbamic acid derivatives, sulfonate ester compounds, sulfonyl compounds, carbodiimide compounds, allyl compounds alone, and/or combinations thereof.

The crosslinked PVP of the present application may readily be synthesized by the procedures that are known to a person skilled in the art, for example, by free radical polymerization methods that include, but not limited to, precipitation polymerization, inverse emulsion polymerization, gel polymerization, dispersion polymerization, solution polymerization, emulsion polymerization, bulk polymerization, suspension polymerization, and liquid dispersion polymerization (LDP). The polymers can also be made through ionic polymerization. Other polymerization techniques employed to carry out the desired polymer of present application is duly disclosed in "Principles of Polymerization" 4th edition, 2004, Wiley by George Odian.

Hydroxyethyl cellulose (HEC) of the present application has a weight average molecular weight ranging from about 50,000 to about 2,000,000 Daltons. The average molecular weight can range from about 50,000 to about 1,500,000 Daltons, from 100,000 to about 1,500,000 Daltons, or from about 200,000 to about 1,300,000 Daltons.

According to another embodiment of the present application, it is provided with an oil and gas treatment composition comprising (i) a blend of hydroxyethyl cellulose (HEC) and crosslinked polyvinylpyrrolidone, (ii) an aqueous based continuous phase, (iii) a reactive clay or shale material, (iv) a salt, and (v) at least one drilling fluid additive.

The weight ratio of hydroxyethyl cellulose (HEC) to crosslinked polyvinylpyrrolidone is from about 9 to about 99.

In accordance with another embodiment of the present application, an aqueous based continuous phase is employed for preparing an oil and gas treatment composition. The aqueous based continuous phase can be fresh water, seawater, brine, simulated brine, or mixtures thereof.

Generally, the brine based fluid of the present application is present in a sufficient amount to achieve the desired density of the drilling fluid composition from about 3 to 30 ppb. The brine fluid may be an aqueous solution of one or more density-increasing water-soluble salt. The density increasing water-soluble salt may be selected from the group consisting of alkali metal halides (for example, sodium chloride, sodium bromide, potassium chloride, potassium bromide, magnesium chloride, ammonium chloride, calcium chloride, calcium bromide, zinc chloride, and/or zinc bromide), alkali metal carboxylates (for example, sodium formate, potassium formate, caesium formate, sodium acetate, potassium acetate or caesium acetate), sodium carbonate, potassium carbonate, alkaline earth metal halides (for example, calcium chloride and/or calcium bromide), and zinc halide salts (for example, zinc chloride and/or zinc bromide) and mixtures thereof. The salt for preparing the brine based fluid of the present application is selected from the group consisting of sodium chloride, potassium chloride, calcium chloride, magnesium chloride, ammonium chloride, zinc chloride, sodium bromide, calcium bromide, zinc bromide, potassium formate, cesium formate, sodium formate and mixtures thereof.

According to another embodiment of the present application, it is contemplated to employ at least one salt selected from the group consisting of di-potassium phosphate, diammonium phosphate, sodium thiosulfate, boric acid, sodium formate, potassium formate, magnesium sulfate, cesium formate, potassium carbonate, sodium carbonate, sodium bicarbonate, diammonium sulfate, potassium acetate, sodium acetate, cesium acetate and combinations thereof.

The amounts of the salt employed for preparing the composition can be varied from about 2.0 wt. % to less than 30 wt. % based on the total weight of the composition. In one non-limiting embodiment, the amounts of the salt in the present application can be varied from about 5.0 wt. % to about 10 wt. % based on the total weight of the composition. Further, the oil and gas treatment composition of the present application contemplates to employ a blend of salts in a range of from about 1.0 wt. % to less than 20 wt. % based on the total weight of the composition.

During oil and/or gas drilling operation, the drilling process comes across swellable reactive clay-like substances that prolong the drilling time required. Various kinds of clays and shale materials can swell, disperse, and migrate causing numerous operation problems during the oil and gas drilling operations. The present application discloses an oil and gas treatment composition comprising a reactive clay selected from the group consisting of phyllo silicate minerals rich in silicon, aluminum oxides, aluminum hydroxides, kaolinite, bentonite, dickite, halloysite, chrysotile, lizardite, amesite, talc, montmorillonite, beidellite, saponite, hectorite, sauconite, vermiculite, muscovite, paragonite, phlogopite, biotite, lepidolite, margarite, clintonite, anandite, donbassite, cookeite, sudoite, clinoclilore, chamosite, nimite, hydrotalcite, meixnerite, stevensite, nontronite, nacrite, hydrobiotite, glauconite, illite, bramallite, chlorite, attapulgite, and sepiolite.

The present application contemplates to employ at least one drilling fluid additive during drilling operation along with the oil and gas treatment composition of the present application. The drilling fluid additive can include, but are not limited to, weighting agents, drilling solids, fluid loss additives (FLA), dispersing agents, bridging agents, chelating agents, antioxidants, viscosity enhancing agents, anti-bit balling agents, lubricating agents, corrosion inhibitors, defoaming agents, salts, sized salts, wetting gents, pH controlling agents, emulsifying agents, synthetic polymeric additives, biopolymers, rheology modifying agents, filtration control agents, suspending agents, and combinations thereof.

Suitable fluid loss additives of the present application can include, but are not limited to, Polydrill, Alcomer® 242 and Alcomer® 507 (available from BASF); KEM-SEAL (available from Baker Hughes); DURALON (available from MI-Swaco); DRISCAL® D (available from Drilling Specialties Company); Hostadrill® (available from Clariant Oil Servies); Therma-Chek® (available from Halliburton Company); terpolymer of acrylamide (AM)/2-acrylamido-2-methyl propanesulfonic acid (AMPS)/cationic monomers; polyanionic cellulose (PAC), carboxymethyl cellulose; carboxy methyl hydroxy ethyl cellulose; lignite; xanthan gum; starch; hydroxy ethyl methyl cellulose; hydroxy propyl methyl cellulose; hydroxy ethyl cellulose; guar gum; hydroxy propyl guar; carboxy methyl hydroxy propyl guar; hydroxy ethyl guar; and mixtures thereof.

The fluid loss additive (FLA) described herein typically has a weight average molecular weight (MW) over 3,000 Daltons, or over 10,000 Daltons, or over 100,000 Daltons. In one non-limiting embodiment, the weight average molecular weight is in a range of from 5,000 to 5,000,000 Daltons. In another non-limiting embodiment, the weight average molecular weight is in a range of from 10,000 to 500,000 Daltons. In yet another non-limiting embodiment, the weight average molecular weight is in a range of from 50,000 to 400,000 Daltons. The weight average molecular weight can be determined by GPC techniques that are known in the art. The required amount of FLA for the desired composition of the present application is in a range of from about 0 ppb to about 30 ppb; or from about 5 ppb to about 20 ppb; or from about 8 ppb to about 15 ppb.

According to an additional embodiment of the present application, it is contemplated to optionally employ at least one rheology modifying agent as known in the art. The suitable rheology modifiers can include, but not limited to, crosslinked, linear poly(vinyl amide/polymerizable carboxylic acid) copolymer; poly(vinylpyrrolidone/acrylic acid); poly(vinyl pyrrolidone (VP)/acrylic acid (AA)) copolymer; terpolymer of acrylamide (AM)/2-acrylamido-2-methyl propanesulfonic acid (AMPS)/hydrophobe; terpolymer of acrylamide (AM)/2-acrylamido-2-methyl propanesulfonic acid (AMPS)/$C_{12-25}$ alkyl acrylate; carboxymethylhydroxyethyl cellulose; sulphoethyl cellulose; starch derivatives/cross-linked starch derivatives including carboxymethyl starch, hydroxyethylstarch, hydroxypropyl starch; bacterial gums including xanthan, welan, diutan, succinoglycan, scleroglucan, dextran, pullulan; plant derived gums such as guar gum, locust-bean gum, tara gum and their derivatives; polyanionic cellulose (PAC); hydroxypropyl cellulose (HPC); carboxymethyl hydroxyethyl cellulose (CMHEC); carboxymethyl cellulose (CMC); xanthan gum; guar gum; and mixtures thereof.

It is contemplated to employ a substance that is denser than water and does not adversely affect other properties of the oil and gas treatment composition, which can be added to raise the density to the desired level. Various finely-ground solid materials can be used as a weighting agent. Several factors in addition to chemical inertness and specific gravity affect the use of a substance as the weighting agent. Firstly, the substance should be available in large quantities. Secondly, it should easily be ground to the suitable particle size distribution, having relatively non-abrasive nature. It should also be moderate in cost, and not injurious or objectionable to the drilling crew or the surroundings. In an exemplary embodiment, the weighting agent may be selected from the group consisting of galena, barite, hematite, illmenite, calcite, dolomite, siderite, celestite magnetite, iron oxide, manganese oxide, sized calcium carbonate, magnesium carbonate, aqueous soluble organic and inorganic salts, and combinations thereof. The suitable amounts of the weighting agents for the present application can be used to achieve the density of from about 8.3 to about 21.0 ppg.

The suitable dispersing agent can include, but are not limited to, plant tannins, lignites, lignosulfonates, polyphosphates, phosphonates, polyacrylates, low molecular weight cellulosic derivatives, polymaleates, poly(maleate/allylsulfonate) and the like. In one non-limiting embodiment, the dispersing agent of the present application is poly(maleate/allylsulfonate) based polymer.

According to another embodiment of the present application, at least one drilling solid is employed to enhance the viscosity, density, gel strength to the drilling fluid or mud, and thus gives it good suspension capacity to oppose any settling of the cuttings. Examples of suitable drilling solid can include, but are not limited to clays bentonite, attapulgite, hectorite, sepiolite, and the synthetic minerals Laponite™ (a synthetic hectorite ex Rockwood Additives Limited) and mixed metal hydroxides. Other clays which may be present in the fluids include kaolinite and illite which can be contaminants arising from drilled shale formations. Some of the shale cuttings inevitably become dispersed in a wellbore fluid as fine illite and kaolinite clay particles. The drilling solid of the present application is finely divided clay particles selected from the group consisting of bentonite, sodium bentonite, attapulgite, sepiolite, saponite, hectorite, and mixtures thereof. The drilling solids for the present application can be varied from 0 to about 30 ppb of the total composition. In one non-limiting embodiment, the drilling solid can be varied from 0 to about 15 ppb.

Sized salts of the present application can include, but are not limited to, sodium chloride, potassium chloride, calcium chloride, sodium formate, potassium formate, sodium bromide, potassium bromide, calcium bromide, sodium acetate, potassium acetate, and the like. In one non-limiting embodiment, the sized salt is sodium chloride. Further, the sized salts have a particle size in a range of from approximately 1 micron to approximately 10,000 microns, or from approximately 10 micron to approximately 5000 microns, or from approximately 100 micron to approximately 1,500 microns.

The bridging agents are incorporated into an oil and gas treatment composition to bridge across pores and fractures of exposed rock, to seal formations, and to facilitate the formation filter cake. Further, these bridging agents are removable or expellable from the wellbore after the drilling operations are complete to facilitate recovery when the well enters for production of shale or oil gas. In this regard, suitable examples of bridging agents can include, but are not limited to, magnesium oxide, manganese oxide, calcium oxide, lanthanum oxide, cupric oxide, zinc oxide, magnesium carbonate, calcium carbonate, zinc carbonate, calcium hydroxide, manganese hydroxide, suspended salts, oil-soluble resins, mica, nutshells, fibers, and mixtures thereof.

The antioxidants of the present application can be sterically hindered polyphenols. Such hindered phenolic antioxidants can include, but are not limited to, ortho-alkylated phenolic compounds such as 2,6-di-tertbutylphenol, 4-methyl-2,6-di-tertbutylphenol, 2,4,6-tri-tertbutylphenol, 2-tert-butylphenol, 2,6-diisopropylphenol, 2-methyl-6-tert-butylphenol, 2,4-dimethyl-6-tert-butylphenol, 4-(N,N-dimethylaminomethyl)-2,6-di-tertbutyl phenol, 4-ethyl-2,6-di-tertbutylphenol, 2-methyl-6-styrylphenol, 2,6-distyryl-4-nonylphenol, 2,2'-ethylidene-bis-(4,6-di-tert-butylphenol), 2,2'-methylene-bis-(4-ethyl-6-tert-butylphenol), 2,2'methylene-bis-(4-methyl-6-tert-butylphenol), 2,2'methylene-bis-[4-methyl-6-(1-methylcyclohexyl)]-phenol, 4,4'-butylidene-bis-(6-tert-butyl-3-methylphenol), 4,4'methylene-bis-(2,6-di-tert-butylphenol), N,N'-1,6-hexamethylene-bis-3-(3,5-di-tert-butyl-4-hydroxyphenyl)propionamide (IRGANOX 1098), 1,6-hexamethylene-bis-(3,5-di-tert-butyl-4-hydroxyhydrocinnamate (IRGANOX 259), triethylene glycol-bis-[3-(3-tert-butyl-4-hydroxy-5-methylphenyl)]propionate (IRGANOX 245), N,N'-bis-(3,5-di-tert-butyl-4-hydroxyhydrocinnamoyl)hydrazine (IRGANOX MD 1024) and nickel or calcium-bis-[O-ethyl(3,5-di-tert-butyl-4-hydroxybenzyl) phosphonate (IRGANOX 1425), tetrakis-[methylene(3,5-di-tert-butyl-4-hydroxyhydrocinnamate)]-methane (IRGANOX 1010), 1,3,5-trimethyl-2,4,6-tris(3',5'-di-tert-butyl-4'-hydroxybenzyl) benzene (IRGANOX 1330), 1,3,5-tris(3,5-di-tert-butyl-4-hydroxybenzyl)isocyanurate, 1,1,3tris(5-tert-butyl-4-hydroxy-2-methylphenyl)butane; 1,1,5,5-tetra-(5-tert-butyl-4-hydroxy-2-methylphenyl)pentane; or ethylene glycol-bis-[3,3-bis-(3'-tert-butyl-4'-hydroxyphenyl)-butyrate]; 2,2-bis-(3,5-di-tert-butyl-4-hydroxybenzyl)-malonic acid-dioctadecyl ester: esters of beta-(3,5-di-tert-butyl-4-hydroxyphenyl) propionic acid with alcohols such as octadecanol or pentaerythritol; spiro compounds such as 3,9-bis-(3,5-di-tert-butyl-4-hydroxyphenyl)-2,4,8,10-tetra-oxaspiro[5,5]-undecane, styrenated phenol, such as Wingstay S (Goodyear), alkylated hindered phenols, such as Wingstay C (Goodyear), butylated reaction product of p-cresol and dicyclopentadiene, such as Wingstay L and their analogs and homologs. Mixtures of two or more such hindered polyphenolic compounds are also suitable. Other hindered polyphenols of the present application are described in U.S. Pat. No. 5,362,783, which is incorporated herein by reference in its entirety. In one nonlimiting embodiment, the hindered polyphenol is butylated reaction product of p-cresol and dicyclopentadiene, a polymeric hindered phenol, commercially available as Wingstay L.

In general, the polymeric hindered phenol has a molecular weight in a range from about 100 to about 10000 Daltons, or from about 200 to about 6000 Daltons. The range of antioxidant for the preparation of drilling mud composition is varied from about 0.01 wt. % to about 5 wt. %, or from about 0.1 wt. % to about 3 wt. %, or from about 0.1 wt. % to about 2 wt. %, or from about 0.1 wt. % to about 1 wt. %.

Inorganic metal impurities, for example, $Fe_3O_4$ may get introduced into the drilling muds during oil and gas treatment from possible sources including, but not limited to, weighting agents, pipes and drilling equipments. The metal impurities can facilitate the degradation of other co-ingredients such as polymer based rheology modifiers (RM) and fluid loss additives (FLA). Therefore, suitable chelating agents can be introduced into the drilling mud composition, which can sequestrate the metal impurities, prevent polymer from decomposition and retain the polymeric characteristics of rheology modifiers (RM) and fluid loss additives (FLA). In one non-limiting embodiment, the sequestering or chelating agent for the present application is triethanolamine. The range of triethanolamine for the preparation of drilling mud composition is varied from about 0.01 wt. % to about 10 wt. %.

Other suitable organic or inorganic sequestering or chelating agent is selected from the group consisting of gluconates, sorbitals, mannitols, carbonates, hydroxamates, catechols, α-amino carboxylates, alkanolamines, metal-ion sequestrants, hydroxy-carboxylic acids, aminocarboxylic acids, amino polycarboxylic acids, polyamines, polyphosphates, phosphonic acids, crown ethers, amino acids, polycarboxylic acids, cyclodextrin, phosphonates, polyacrylates or polymeric polycarboxylates, condensed phosphates, The sequestering or chelating agents can include, but are not limited to, acetic acid, adenine, adipic acid, alanine, alanine, albumin, arginine, ascorbic acid, asparagine, aspartic acid, ATP, benzoic acid, n-butyric acid, casein, citraconic acid, citric acid, cysteine, dehydracetic acid, desferri-ferrichrysin, desferri-ferrichrome, desferri-ferrioxamin E, 3,4-dihydroxybenzoic acid, diethylenetriaminepentaacetic acid (DTPA), hydroxylpropylenediaminetetraacetic acid (DPTA), dimethylglyoxime, dimethylpurpurogallin, EDTA, glutamic acid-N,N-diacetic acid tetrasodium salt (GLDA-$Na_4$), formic acid, fumaric acid, globulin, gluconic acid and its alkali metal salts, glutamic acid, glutaric acid, glycine, glycolic acid, glycylglycine, glycylsarcosine0, guanosine, histamine, salicylic, pimalic acid sulfamic acid, salicylic, glutaric, malonic acid, 1,10-phenanthroline, 2-pyridylacetic acid, 5-formylfuran sulfonic acid, N-tris(hydroxymethyl)methyl-2-aminoethanesulfonic acid, itaconic acid, chelidonic acid, 3-methyl-1,2-cyclopentanedione, glycolamide, histidine, 3-hydroxyflavone, inosine, iron-free ferrichrome, isovaleric acid, itaconic acid, kojic acid, lactic acid, leucine, lysine, maleic acid, malic acid, methionine, methylsalicylate, nitrilotriacetic acid (NTA), ornithine, orthophosphate, oxalic acid, oxystearin, phenylalanine, phosphoric acid, phytate, pimelic acid, pivalic acid, polyphosphate, proline, propionic acid, purine, pyrophosphate, pyruvic acid, riboflavin, salicylaldehyde, salicyclic acid, sarcosine, serine, sorbitol, succinic acid, tartaric acid, tetrametaphosphate, thiosulfate, threonine, trimetaphosphate, triphosphate, tryptophan, uridine diphosphate, uridine triphosphate, n-valeric acid, valine, xanthosine, triethylenetetraaminehexaacetic acid, N,N'-bis(o-hydroxybenzyl) ethylenediamine-N,N' diacteic acid, ethylenebis-N,N'-(2-o-hydroxyphenyl)glycine, acetohydroxamic acid, desferroxamine-B, disulfocatechol, dimethyl-2,3-dihydroxybenzamide, mesitylene catecholamide (MECAM), 1,8-dihydroxynaphthalene-3,6-sulfonic acid, and 2,3-dihydroxynaphthalene-6-sulfonic acid, siderophores molecules, N,N-dicarboxymethyl-2-aminopentanedioic-acid, diethylenetriaminepentaacetic-acid, ethylene-diaminetetraacetates, nitriloacetates or N-(2-hydroxyethyl)nitrilodiacetates), 2,2-dichloropropionic acid, 2,2-dibromobutyric acid, trifluoroacetic acid, tribromoacetic acid, trichloroacetic acid, 2,3-dibromopropionic acid, 2,2-dichlorovaleric acid, 3-nitropropionic acid, triiodoacetic acid, 3(2,2,2-trichloroethoxy)propionic acid, 4-nitro-2-chlorobutyric acid, 2-bromo-2-nitropropionic acid, 2-nitroacetic acid, 2,4-dihydroxyphenyl acetic acid, 2,4-dichlorophenyl acetic acid, 3(2',4'-dibromophenoxy)propionic acid, 3(3',5'-dinitrophenoxy)propionic acid, 3-phenyl-2,3-dibromopropionic acid, 3,5-dinitrosalicylic acid, 3(3'-bromo-4'-nitrophenyl)propionic acid, 3(3',4'-dihydroxyphenyl)propionic acid alone or in combination. Further, information on sequestering and chelating agents is disclosed in T. E. Furia, CRC Handbook of Food Additives, $2^{nd}$ Edition, pp. 271-294 (1972), and M. S. Peterson and A. M. Johnson (Eds.), Encyclopedia of Food Science, pp. 694-699 (1978), which is incorporated herein by reference in its entirety. The most suitable sequestering agent of the present application is glutamic acid-N,N-diacetic acid tetrasodium salt (GLDA-$Na_4$). The usable range of chelating agent is varied from about 0.01 to about 20% by weight, or from about 0.01 to about 5.0% by weight, or from about 0.01 to about 2% by weight based on the total weight of the aqueous fluid composition.

Anti-bit balling agents can be used to prevent compaction and adherence of drill cuttings to the cutting surfaces of the drill bit, causing fouling and a reduction of drill performance. Suitable examples of anti-bit balling agents can include, but are not limited to, glycols, surfactants and mixtures thereof.

Lubricating agents are often added to the drilling fluid to overcome friction and to decrease torque and drag. Lubricating agents typically fall into two categories: solid lubricants and liquid lubricants. Examples of solids for improving lubricity during drilling include ashphaltic materials, bentonite clays, gilsonite, cellulose materials, and even plastic and glass beads. Examples of liquids to improve lubricity during drilling include diesel oil, vegetable oil, detergents, alcohols, glycerins and amines. U.S. Pat. No. 4,876,017 discloses a synthetic hydrocarbon compound, specifically a polyalphalolefin, which may be combined with emulsifiers and thinners, as a downhole lubricant in an offshore drilling operation. U.S. Pat. No. 5,045,219 is exclusively directed to a liquid polyalphaolefin lubricant composition for use in offshore drilling. Other possible lubricating agents are wax or a waxy substance, plastic beads, glass beads, nut hulls, graphite, oils, synthetic fluids, glycols, modified vegetable oils, fatty-acid soaps, surfactants, and mixtures thereof, in the form of particles or pellets. The lubricating agent may be added prior to drilling while drilling ahead, or may be spotted downhole during drilling, or a combination of the above addition steps.

Filtration control agent may be in the form of fibers, flakes, sheets, powders, crystalline solids, and the like. Suitable filtration control agents may comprise cellulose derivatives (e.g., modified guars, hydroxyethyl cellulose, carboxymethyl cellulose, carboxymethyl hydroxyethyl cellulose), latex polymers, and copolymers of acrylamido-2-methyl-2-propanesulfonic acid, starches, modified starches, carboxymethyl cellulose, polyanionic cellulose, polyacrylates, and the like.

At least one suspending agent is added to the composition of the present application to increase the viscosity of hydrocarbons and to resist their agglomeration. The typical non-limiting suspending agents of the present application can include organophilic clays, hydrophobic silicas, and/or oil compatible polymer based suspending agents that are disclosed in U.S. Pat. No. 4,670,501 and U.S. Pat. No. 4,772,646. These references are hereby incorporated by reference in their entirety.

The present application discloses that the oil and gas treatment composition additionally comprises (a) an organophilic clay, (b) a stabilizer and (c) white medicinal or mineral oil along with the blend of hydroxyethyl cellulose (HEC) and crosslinked polyvinylpyrrolidone described above, an aqueous based continuous phase, a reactive clay or shale material and at least one drilling fluid additive selected from the group consisting of rheology modifiers, a fluid loss additives, dispersants, lubricity enhancers, and shale inhibitors. The blend is in a range of from about 40 wt. % to about 80 wt. % based on the total weight of the composition. The stabilizer is a non-ionic surfactant selected from the group consisting of sorbitan esters, ethoxylated sorbitan esters, ethoxylated fatty alcohols, ethoxylated fatty acids and combinations thereof. The white medicinal oil is non-toxic and biodegradable 60% at least after 28 days in fresh water and seawater under Organization for Economical Commercial Development (OECD) 301 and OECD 306 test protocols respectively. Also, the white medicinal oil should be in compliance with major Pharmacopeia and F.D.A. regulations and the EPA requirements with regard to "oil and grease" test. It also should have a Classification in, at least, category "D" under revised OCNS regulations. Further, it is contemplated to use any white mineral oil as long as it is in compliance with food contact regulations (i.e., it is edible).

The white medicinal oil can have a low kinetic viscosity at 40° C. The white medicinal oil can have a lower limit of the kinetic viscosity (at 40° C.) as about 2 $mm^2$ $sec^{-1}$ (2 centistokes (cSt); or 5 cSt, or 7.5 cSt. Generally, the upper limit of the kinetic viscosity at 40° C. of the white medicinal oil can be about 17 cSt, or 14 cSt, or 10 cSt. The white medicinal oil can also have no aromatic content. It should be noted that any aromatic content of 100 ppm or less is considered to be free of aromatics. In one non-limiting embodiment, the aromatic content can be less than 50 ppm. In another non-limiting embodiment, the aromatic content can be less than 30 ppm with zero aromatic content being the most desired level.

The flash point of the white medicinal oil can be above 100° C., or above 110° C., or above 120° C. On the other hand, the pour point of the white mineral oil can be as low as possible, generally being lower than −5° C., or lower than −10° C., or lower than −15° C.

In accordance with one embodiment of the present application, the white medicinal oil or white mineral oil is in a range of from about 20 wt. % to about 60 wt. %, or from about 30 wt. % to about 40 wt. %, or from about 20 wt. % to about 50 wt. % based on the total weight of the oil and gas treatment composition.

The commercially available non-limiting white mineral for the present application can include Carnation® oil from Sonneborn Refined Products, Marcol®52 from Exxon Mobil, Ondina®3 from Shell and Ecolane®130 from TOTAL FINA.

The organophilic clays may be used in a wide variety of subterranean applications. The "organophilic clay" refers to clay that is compatible with oils. In subterranean applications, organophilic clays are used in cementing and sealing operations to add viscosity and/or suspending power to various fluids. Further, organophilic clay may also be used in a variety of surface applications as viscosifying agents, suspending agents, etc.

Suitable organophilic clay for the present application is smectite based clay selected from the group consisting of montmorillonite, beidellite, nontronite, and combinations thereof. According to the present application, the organophilic clay is a modified montmorillonite designed for use in organic systems containing from low to high polarity solvents or solvent blends. It provides reproducible viscosity and thixotropy development, a high degree of sag control and prevents solid particles from settling. Any organophilic clay can be used as the suspending agent, but the ones described above are self-dispersing and do not require a polar activator (e.g., water, methanol, ethanol, propylene carbonate, etc.). The amount of suspending agent required for the present application is in a range of from about 0.1 wt. % to about 10.0 wt. %, or from about 0.5 wt. % to about 2.0 wt. %. Examples of organophilic clays are Tixogel® (United Catalyst Inc., Louisville, Ky.), Bentone® (Rheox company, Hightestown, N.J.) and Claytone® (Southern Clay Products, Gonzalez, Tex.).

In oil-based drilling fluids, surfactants are used primarily as emulsifying and stabilizing agents. Solids present in oil base muds must be kept wet with oil to prevent settling and mud instability. The non-ionic surfactant(s) suitable for use in the present application has a hydrophilic-lipophilic balance (HLB) of from about 1 to about 14, or from about 1.4 to about 11. The range of stabilizing agent is in a range of from about 0.5 wt. % to about 10.0 wt. % based on the total composition.

Examples of surfactants used in the present application are non-ionic, such as sorbitan esters, ethoxylated sorbitan esters (e.g., polyethoxyethylene sorbitan esters), ethoxylated fatty alcohols (e.g., oxo, lauryl, cetyl, straeryl, cetyl-stearyl and oleyl polyethoxyethylene fatty alcohols), and ethoxylated fatty acids (e.g., Oleic and Stearic polyethoxyethylene fatty acids). In one non-limiting embodiment, the surfactants are sorbitan esters, ethoxylated sorbitan esters, or mixtures thereof. The surfactant can be a blend of sorbitan trioleate and ethoxylated sorbitan trioleate such as Montane® 85/Montanox® 85 products, available from SEPPIC (Paris, France) and Sorban® AO/Sorbanox® AO products, available from Witco (Saint Pierre-les-Elboeuf, France). Non-ionic surfactants are blended in such a way to achieve an average HLB value of about 10 for the optimum slurry stability.

According to one aspect of the present application, the oil and gas treatment composition does not contain any nonylphenol ethoxylate surfactants (NPES). These surfactants are strictly prohibited from the use in the North Sea sector.

One embodiment of the present application discloses an optional use of hydrophilic polymers in the range of from about 10 wt. % to about 45 wt. % based on the total composition. The biodegradable "Category E" based polymers selected from the group consisting of polysaccharides such as cellulose ethers, biopolymers, starch, and guar gum and its derivatives are used in a wide variety of oil field applications. The cellulose ethers include carboxymethyl cellulose (CMC), hydroxyethyl cellulose (HEC), carboxymethyl-hydroxyethyl cellulose (CMHEC), and polyanionic cellulose (PAC). The guar gum derivatives include straight guar (Guar), carboxymethylguar (CMG), hydroxypropylguar (HPG), carboxymethylhydroxypropylguar (CMHPG) and cationic guar (Cat. Guar). The starch includes carboxymethyl starch, hydroxyethyl starch, and hydroxypropyl starch.

Biopolymers include xanthan gum (XG), scleroglucone, welan, and gelan. Additionally, to these polysaccharides, synthetic polymers such as polyacrylamide (PAAM) and polyacrylates (PMC) may be used.

Guar and its derivatives are the most extensively used polymers in fracturing fluids. They are specially designed for hydraulic fracturing. Guar is used to thicken the fracturing fluid so that it can carry graded sand (proppant) into the fractured formation. Guar and its derivatives can also be used as viscosifiers and fluid loss additives in low solids drilling muds. Due to their non-ionic nature and high mean average molecular weight (Mw), guar has the ability to increase viscosity in water or brines.

Examples of additional additives can be selected from the group consisting of bactericides, detergents and emulsifiers, solid and liquid lubricants, gas-hydrate inhibitors, corrosion inhibitors, defoaming agents, scale inhibitors, enzymes, oxidizing polymer-breakers, emulsified hydrophobic liquids such as oils, acid gas-scavengers (such as hydrogen sulfide scavengers), thinners (such as lignosulfonates), demulsifying agents and surfactants designed to assist the clean-up of invaded fluid from producing formations, polymeric additives, dispersants, shale stabilizers or inhibitors, pH controlling agents, wetting agents, biopolymers, pH controlling agents and mixtures thereof. The ideal additives can include polymeric additives, filtration control additives, dispersants, shale stabilizers or inhibitors, clay swell inhibitors, pH controlling agents or buffers, emulsifiers, antifoaming agents, wetting agents, surfactants, corrosion inhibitors, lubricants, biocides or mixtures thereof.

The present application provides an oil-well servicing fluid comprising (a) an oil and gas treatment composition comprising (i) a blend of hydroxyethyl cellulose (HEC) and crosslinked polyvinylpyrrolidone, (ii) an aqueous based continuous phase, (iii) a reactive clay or shale material, (iv) at least one salt, (v) at least one drilling fluid additive, and (b) a particulate component.

The particulate component may be any of the numerous particulate materials used in oil-well servicing fluids and may be selected from the group consisting of cement, silica flour, fumed silica, pozzoline, sodium silicate, calcium carbonate, barite, hematite clay, polypropylene particles, nut plugs, natural or synthetic rubbers and combinations thereof. The size of the particulate component may range from about 10 µm to about 1000 µm.

In one non-limiting embodiment, the particulate component is cement.

Another aspect of the present application provides a method for inhibiting hydration of clay or shale materials in drilling a subterranean well. The method comprises using the oil and gas treatment composition comprising (i) a blend of hydroxyethyl cellulose (HEC) and crosslinked polyvinylpyrrolidone, (ii) an aqueous based continuous phase, (iii) a reactive clay or shale material, (iv) at least one salt substance, and/or (v) at least one drilling fluid additive. The weight ratio of HEC to crosslinked PVP is from about 9 to about 99.

According to another aspect of the present application, a method of inhibiting hydration of clays or shale materials in drilling a subterranean well comprising the steps of: (i) preparing an aqueous drilling fluid composition comprising: (a) an aqueous based continuous phase comprising fresh water, seawater, brine, simulated brine, or mixtures thereof; (b) a reactive clay or shale material; and (c) a shale hydration inhibitor comprising HEC and crosslinked PVP, (ii) circulating the aqueous drilling fluid composition into and through the well, and (iii) contacting the clays or shale materials during the circulation with a sufficient amount of the aqueous based drilling liquid for inhibiting hydration of the clays or shale materials. The weight ratio of HEC to crosslinked PVP is from about 9 to about 99.

According to one embodiment of the present application, the composition of inhibiting hydration of clay or shale material in drilling a subterranean well further comprises at least one drilling fluid additive selected from the consisting of weighting agents, drilling solids, fluid loss additives (FLA), dispersing agents, bridging agents, chelating agents, antioxidants, viscosity enhancing agents, anti-bit balling agents, lubricating agents, corrosion inhibitors, defoaming agents, salts, wetting gents, pH controlling agents, emulsifying agents, synthetic polymeric additives, biopolymers, rheology modifying agents, filtration control agents, suspending agents and combinations thereof.

The present invention is illustrated in detail by way of the below given examples. The examples are given herein for illustration of the invention and are not intended to be limiting thereof.

EXAMPLES

Crosslinked PVP solution with 10 wt % of solids used in the Examples below was prepared based on the disclosure of U.S. Pat. No. 6,548,579, which is incorporated herein by reference in its entirety.

Example 1

About 0.33 wt. % shale swell inhibitor was added into a 40 ppb KCl solution to make a homogenous solution. The dried London shale (10.00 g) having particle sizes of from 2 mm to 4 mm was added to the above solution in a 250 ml polypropylene bottle. The bottle was put into a roller oven at 65.5° C. for 16 hr (aging). After aging, the shale was recovered on a No. 10 screen, washed with tap water, and dried at 110° C. for 2 hr. The shale was then cooled down to room temperature in a desiccator and weighed. The shale recovery % was calculated based on the following equation:

$$\text{Shale recovery \%} = \frac{\text{Recovered shale weight}}{10.00} \times 100\%$$

The ingredients and the results are shown in Table 1.

TABLE 1

| Shale Swell Inhibitor Component | 40 ppb KCl (g) | Shale Swell Inhibitor (g) | Shale Recover Rate (%) | After Aging Appearance | Small Shale Formed after Testing |
|---|---|---|---|---|---|
| Crosslinked PVP solution (10% solids) | 178.90 | 6.11 | 97 | Hazy solution | None |
| Natrosol ™ 250 HHBR | 184.39 | 0.61 | 95 | — | — |
| Natrosol ™ 250 HHBR/ Crosslinked PVP solution (10% solids) (95/5) | 184.11 | 0.58/ 0.31 | 100 | — | — |
| Natrosol ™ 180 GR | 184.39 | 0.61 | 69 | Muddy solution | Some |
| Natrosol ™ 180 GR/ Crosslinked PVP solution (10% solids) (95/5) | 184.11 | 0.58/ 0.31 | 88 | Clear solution | None |

(1) Natrosol ™ 250 HHBR - hydroxyethyl cellulose, commercially available from Ashland Inc.
(2) Natrosol ™ 180 GR - low viscosity hydroxyethyl cellulose fluid loss additive, commercially available from Ashland Inc.

Table 1 demonstrates that a small amount of crosslinked PVP in the blend of HEC/crosslinked PVP improves the shale recovery compared to HEC alone.

Example 2

The drilling fluid (mud) formulations 1-5 (~10 ppg) as shown in Table 2 were prepared on a 600 g scale containing a weighting agent (API barite), a rheology modifier (xanthan gum), a fluid loss control additive (PAC-L) and shale swell inhibitors. Sufficient mixing was conducted to facilitate dissolving all the ingredients. The drilling fluids were allowed to agitate for 5 to 15 minutes between the addition of each component and with 30 to 50 minutes total for complete and homogenous mixing. Rheological properties were then measured on a Fann 35 after hot rolling (AHR) aging tests. The testing results are shown in Table 2.

TABLE 2

| Ingredients | Mixing Time | Formulation No. 1 | 2 | 3 | 4 | 5 |
|---|---|---|---|---|---|---|
| 40 ppb KCl, ml | — | 320 | 320 | 320 | 320 | 320 |
| NaOH, 50% | 30 sec | 1 drop | 1 drop | 1 drop | 1 drop | 1 drop |
| Xanthan gum, ppb | 10 min | 1.5 | 1.5 | 1.5 | 1.5 | 1.5 |
| PAC-L, ppb | 10 min | 4 | 4 | 4 | 4 | 4 |
| Natrosol ™ 180 GR, ppb | 10 min | — | 1 | 0.7 | 0.7 | — |
| Crosslinked PVP solution, (10% solids), ppb | 5 min | 10 (1 ppb active) | — | 2.94 (0.3 ppb active) | 10 (1 ppb active) | — |
| PVP K-30, ppb | 5 min | — | — | — | 0.3 | 1 |

TABLE 2-continued

| Ingredients | Mixing Time | Formulation No. | | | | |
|---|---|---|---|---|---|---|
| | | 1 | 2 | 3 | 4 | 5 |
| API barite, ppb | 10 min | 90 | 90 | 90 | 90 | 90 |
| Hot rolling condition | | 65.5° C./16 hr Hot Rolling | | | | |
| Shale recovery (%) | | 90 | 85 | 95 | 88 | 80 |
| Fann Data@49° C. | | | | AHR | | |
| 600 rpm | | 41 | 49 | 49 | 47 | 35 |
| 300 rpm | | 33 | 40 | 40 | 38 | 29 |
| 200 rpm | | 28 | 35 | 34 | 32 | 26 |
| 100 rpm | | 21 | 27 | 25 | 26 | 21 |
| 6 rpm | | 9 | 12 | 11 | 12 | 11 |
| 3 rpm | | 8 | 10 | 10 | 10 | 10 |
| PV, mPa · s | | 8 | 9 | 9 | 9 | 6 |
| YP, lb/100 ft$^2$ | | 25 | 31 | 31 | 29 | 23 |

(1) PVP K-30—polyvinylpyrrolidone, commercially available from Ashland Inc.

Table 2 Demonstrates:

i. A blend of HEC/crosslinked PVP provides better shale recovery rates in mud formulation in comparison to HEC or crosslinked PVP alone.

ii. Crosslinked PVP boosts the HEC shale inhibition from 85% to 95% at a 70/30 blend with HEC, while linear PVP (Mw 30,000-80,000) provides negligible improvement from 85 to 88% at a 70/30 blend with HEC.

iii. Crosslinked PVP itself shows a good (90%) recovery in mud formulation while linear PVP (Mw 30,000 to 80,000) provides moderate (80%) recovery.

iv. A blend of HEC/crosslinked PVP generates better shale swelling inhibition than a blend of HEC/linear PVP or linear PVP alone.

v. A blend of HEC/crosslinked PVP can be used as an environmentally friendly SSI since the major component of the blend is HEC.

Example 3

The drilling fluid (mud) formulations 6 and 7 (~10 ppg) containing a FPS solution sample were prepared. The ingredients for preparing the FPS solution sample are shown in Table 3. The ingredients of the drilling formulations 6 and 7 are listed in Table 4. Sufficient mixing was conducted to facilitate dissolving all the ingredients. The drilling fluids were allowed to agitate for 5 to 15 minutes between the addition of each component and with 30 to 50 minutes total for complete and homogenous mixing. Rheological properties were then measured on a Fann 35 after hot rolling (AHR) aging tests. The testing results are also shown in Table 4.

TABLE 3

| FPS Sample Composition | Amounts, gram |
|---|---|
| Mineral Oil | 128 |
| Organoclay | 6 |
| Montane 85 | 0.66 |
| Montanox 85 | 5.34 |
| Natrosol ™ 180 GR | 40 |
| Crosslinked PVP, (10% solids) | 20 |

TABLE 4

| Ingredients | Mixing Time | Formulation No. | |
|---|---|---|---|
| | | 6 | 7 |
| 40 ppb KCl, ml | — | 320 | 320 |
| NaOH, 50% | 30 sec | 1 drop | 1 drop |
| Xanthan gum, ppb | 10 min | 1.5 | 1.5 |
| PAC-L, ppb | 10 min | 4.0 | 4.0 |
| Crosslinked PVP solution, (10% solids), ppb | 10 min | 1.02 | — |
| FPS Sample, ppb | 5 min | — | 4.76 (active 1.0) |
| API barite, ppb | 10 min | 90 | 90 |
| Hot rolling condition | | 65.5° C./16 hr Hot Rolling | |
| Shale recovery (%) | | 83 | 91 |
| Fann Data @ 49° C. | | AHR | AHR |
| 600 rpm | | 49 | 48 |
| 300 rpm | | 40 | 38 |
| 200 rpm | | 35 | 33 |
| 100 rpm | | 27 | 27 |
| 6 rpm | | 12 | 12 |
| 3 rpm | | 10 | 11 |
| PV, mPa · s | | 9 | 10 |
| YP, lb/100 ft$^2$ | | 31 | 28 |

Table 4 shows that the FPS sample containing the blend of HEC/crosslinked PVP provides better shale recovery.

Example 4

In order to determine the swelling characteristics of the drilling fluid containing shale swelling inhibitors, a linear swell percentage was determined in each drilling fluid on a Fann Linear Swell Meter (Model 2000).

For each test, a pellet was prepared by compacting 20.0 grams of sodium bentonite in a 1.14 inch diameter die under approximately 10000 psi for 2 hours. The thickness of each pellet was measured by a caliper. Pellets were placed in a chamber containing saturated $CaCl_2$ solution to maintain 29.5% moisture for overnight conditioning before testing.

Figure 1B:
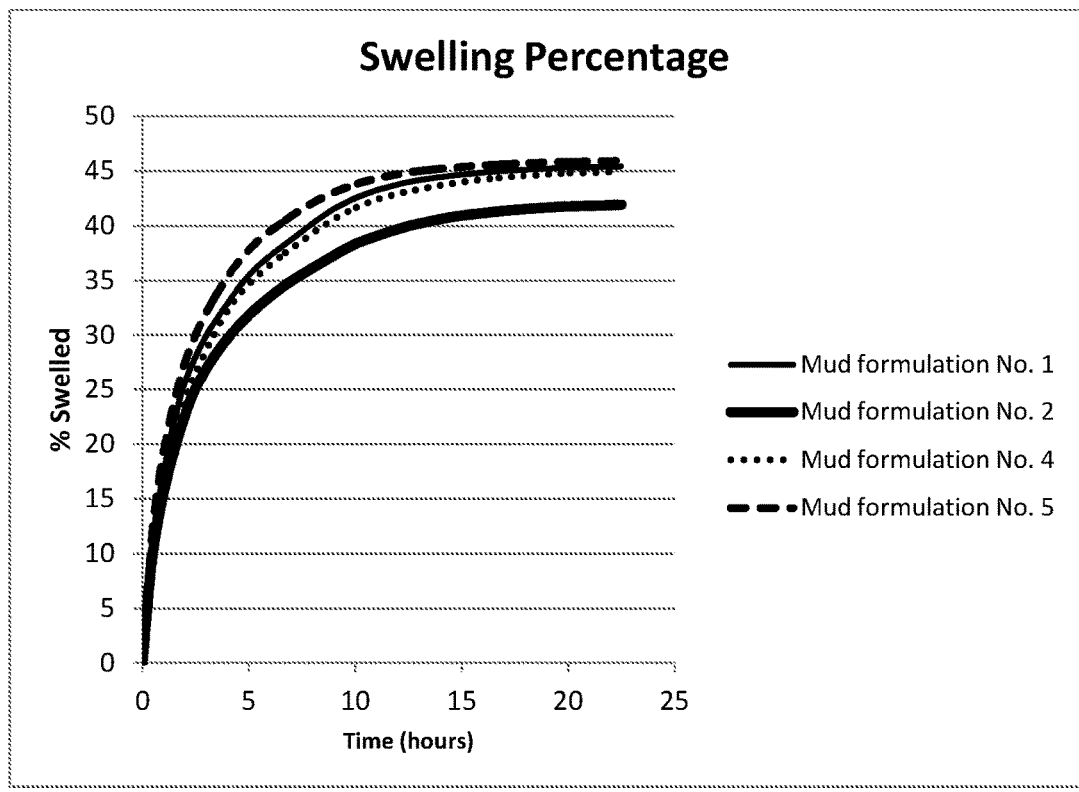
FIG. 1b shows the swelling percentages of Mud Formulations 1, 2, 4 and 5 prepared in Example 2.

The conditioned pellet was placed in a 100 mm (D)×50 mm (H) evaporation dish positioned on the linear swell meter. Approximately 250 ml aged drilling fluid was added in the dish. The amounts of linear swelling were recorded versus time. The linear shale swelling percentages for the drilling fluid formulations prepared in Example 2 are shown in FIGS. 1a and 1b. Table 5 lists the linear shale swelling percentages for Formulations 1-5 at 20 hours.

TABLE 5

| Formulation No. | Linear Shale Swelling Percentage (at 20 hr) |
| --- | --- |
| 1 | 46.7 |
| 2 | 41.8 |
| 3 | 41.2 |
| 4 | 44.7 |
| 5 | 45.8 |

Low swelling percentages of Table 5 indicates good shale swell inhibition. In addition, the data in FIG. 1a, 1b and Table 5 exhibits:
i. Pure HEC generates the lowest linear swelling percentage compared to crosslinked PVP and linear PVP;
ii. A blend of HEC/crosslinked PVP yields lower linear swelling percentage than crosslinked PVP or linear PVP.
iii. A blend of HEC/crosslinked PVP yields comparable linear swelling percentage compared to HEC alone.
iv. A blend of HEC/linear PVP yields comparable (high) linear swelling percentage to crosslinked PVP or linear PVP. The blend of HEC/Linear PVP is not as good as HEC or HEC/crosslinked PVP.

The blend of HEC/crosslinked PVP generates better shale scale inhibition than the crosslinked PVP, linear PVP, or blend of HEC/linear PVP. Therefore, a blend of HEC/crosslinked PVP can be used as high efficiency environmentally friendly shale swell inhibitors.

While this inventive concept(s) has been described in detail with reference to certain embodiments, it should be appreciated that the present application is not limited to those precise embodiments. Many modifications and variations can present themselves to those skilled in the art without departing from the scope and spirit of this application.

What is claimed is:

1. An oil and gas treatment composition comprising a blend of hydroxyethyl cellulose (HEC) and crosslinked polyvinylpyrrolidone, wherein the weight ratio of the HEC to the crosslinked polyvinylpyrrolidone is from about 9 to about 99, and wherein the crosslinked polyvinylpyrrolidone is prepared using crosslinking agents that comprise at least two olefinic double bonds and are selected from the group consisting of N,N'-divinylimidazolidone (DVI), N,N',N"-triallyl-triazine-trione, methyene-bis-acryamide, methylene-bis-(meth)acrylamide, triallyl amine, triallylglucose, ethyleneglycol-di-(meth)acrylate, diethyleneglycol-di-(meth)acrylate, triethyleneglycol-di-(meth)acrylate, tetraethyleneglycol-di-(meth)acrylate, polyethyleneglycol-di-(meth)acrylate, pentaerythritol-tri-allylether, pentaerythritol-di-allylether, pentaerythritol-tetra-allylether, pentaerythritol-di-(meth)acrylate, pentaerythritol tri(meth)acrylate, pentaerythritol-tetra-(meth)acrylate, 1-vinyl-3-(E)-ethylidene-pyrrolidone (EVP), allyl methacrylamide, allyl glycidyl ether, glycidyl acrylate, hydroxyacrylamide, triallyl-1,3,5-triazine-2,4,6(1H,3H,5H)-trione, 2,4,6-triallyloxy-1,3,5-triazine and divinylbenzene.

2. The oil and gas treatment composition of claim 1, wherein the crosslinked polyvinylpyrrolidone has a Brookfield viscosity of from about 100 to about 10,000 mPa·s in 5% aqueous solution.

3. The oil and gas treatment composition of claim 1, further comprising an aqueous based continuous phase, a reactive clay or shale material and at least one drilling fluid additive.

4. The oil and gas treatment composition of claim 3, wherein the aqueous based continuous phase is fresh water, seawater, brine, simulated brine, or mixtures thereof.

5. The oil and gas treatment composition of claim 3, wherein the reactive clay or shale material is phyllo silicate minerals rich in silicon, aluminum oxides, aluminum hydroxides, kaolinite, bentonite, dickite, halloysite, chrysotile, lizardite, amesite, talc, montmorillonite, beidellite, saponite, hectorite, sauconite, vermiculite, muscovite, paragonite, phlogopite, biotite, lepidolite, margarite, clintonite, anandite, donbassite, cookeite, sudoite, clinoclilore, chamosite, nimite, hydrotalcite, meixnerite, stevensite, nontronite, nacrite, hydrobiotite, glauconite, illite, bramallite, chlorite, attapulgite or sepiolite.

6. The oil and gas treatment composition of claim 3, wherein the drilling fluid additive is selected from the group consisting of weighting agents, drilling solids, fluid loss additives (FLA), dispersing agents, bridging agents, chelating agents, antioxidants, viscosity enhancing agents, anti-bit balling agents, lubricating agents, corrosion inhibitors, defoaming agents, salts, wetting gents, pH controlling agents, emulsifying agents, synthetic polymeric additives, biopolymers, rheology modifying agents, filtration control agents, suspending agents, and combinations thereof.

7. The oil and gas treatment composition of claim 6, wherein the weighting agent is selected from the group consisting of barite, hematite, manganese oxide, iron oxide, sized calcium carbonate, magnesium carbonate, aqueous soluble organic and inorganic salts, and combinations thereof.

8. The oil and gas treatment composition of claim 6, wherein the drilling solid is finely divided clay particles selected from the group consisting of bentonite, sodium bentonite, attapulgite, sepiolite, saponite, hectorite and combinations thereof.

9. The oil and gas treatment composition of claim 3, further comprising a salt selected from the group consisting of di-potassium phosphate, diammonium phosphate, sodium thiosulfate, boric acid, sodium formate, potassium formate, magnesium sulfate, cesium formate, potassium carbonate, sodium carbonate, sodium bicarbonate, diammonium sulfate, potassium acetate, sodium acetate, cesium acetate and combinations thereof.

10. The oil and gas treatment composition of claim 9, wherein the salt is in a range of from about 2 wt % to less than 30 wt % based on the total weight of the composition.

11. The oil and gas treatment composition of claim 9, wherein the blend is in a range of from about 1 wt % to about 20 wt % based on the total weight of the composition.

12. The oil and gas treatment composition of claim 1, further comprising an organophilic clay; a stabilizer; and a white medicinal oil, wherein the stabilizer is a non-ionic surfactant selected from the group consisting of sorbitan esters, ethoxylated sorbitan esters, ethoxylated fatty alcohols, ethoxylated fatty acids and combinations thereof, and wherein the white medicinal oils is non-toxic and biodegradable 60% at least after 28 says in freshwater and seawater under OECD 301 and OECD 306 test protocol.

13. The oil and gas treatment composition of claim 12, wherein the white medicinal oil is varied in a range of from about 20 wt % to about 60 wt % based on the total weight of the composition.

14. The oil and gas treatment composition of claim 12, wherein the white medicinal oil has a Kinetic viscosity of from about 2 $mm^2$ $sec^{-1}$ to about 17 $mm^2$ $sec^{-1}$ at 40° C.

15. The oil and gas treatment composition of claim 12, wherein the white medicinal oil has a flash point above 100° C.

16. The oil and gas treatment composition of claim 12, wherein the white medicinal oil has a pour point lower than −5° C.

* * * * *